United States Patent [19]

Petrak et al.

[11] Patent Number: 4,460,528
[45] Date of Patent: Jul. 17, 1984

[54] REFRACTORY

[75] Inventors: Daniel R. Petrak, Lynchburg, Va.; Howard M. Winkelbauer, West Mifflin, Pa.; Thomas R. Kleeb, Pittsburgh; Ke-Chin Wang, Upper St. Clair, both of Pa.

[73] Assignee: Dresser Industries, Inc., Dallas, Tex.

[21] Appl. No.: 263,390

[22] Filed: May 12, 1981

Related U.S. Application Data

[62] Division of Ser. No. 149,610, May 14, 1980, abandoned.

[51] Int. Cl.³ .................. C04B 35/02; C04B 35/44
[52] U.S. Cl. ........................................ 264/65; 264/82; 501/120; 501/127; 501/129; 501/96; 501/97
[58] Field of Search .................. 264/65, 82; 501/120, 501/127, 129, 96, 97

[56] References Cited

U.S. PATENT DOCUMENTS

| | | | |
|---|---|---|---|
| 3,679,444 | 7/1972 | Washburn | 264/65 |
| 3,991,148 | 11/1976 | Lumby et al. | 264/65 |
| 3,991,166 | 11/1976 | Jack | 501/10 |
| 4,113,503 | 9/1978 | Lumby et al. | 501/98 |
| 4,184,884 | 1/1980 | Jong | 264/65 |
| 4,243,621 | 1/1981 | Mori et al. | 264/65 |

OTHER PUBLICATIONS

Hoch et al., In Ceramic Bulletin, vol. 58, No. 2 (1979), pp. 191-193.

Primary Examiner—James H. Derrington
Attorney, Agent, or Firm—Barry E. Deutsch

[57] ABSTRACT

A means for producing nitride bonded refractory shapes, in situ, by mixing an aluminum metal powder, relatively pure silica, crude clay and a refractory aggregate. The mixes are pressed into shapes and burned at elevated temperatures in a nitriding atmosphere to form the bond.

4 Claims, No Drawings

REFRACTORY

This is a division of application Ser. No. 149,610, filed May 14, 1980, now abandoned.

Silicon nitride, aluminum nitride and aluminum oxide in the form of fine powders when thoroughly and uniformly mixed in suitable proportions, and heated at elevated temperatures, can provide ceramics which have relatively good high temperature properties and application in excess of 1400° C. Nitride compounds referred to as sialon compounds have been synthesized by mixing alpha and/or beta silicon nitride with alpha and/or gamma alumina powder. Sialon generally means an intimate dispersion of alumina oxide throughout a silicon nitride matrix. It is believed that upon sintering, the material becomes a solid solution of aluminum oxide in silicon nitride. The letters which make up the term "sialon" are the letters taken from the chemical abbreviation for the elements therein, that is, silicon, aluminum, oxygen and nitrogen.

Considerable effort has been directed to the development of ceramic articles containing 80% and more of silicon nitride, silicon oxynitride and/or sialon. These articles consist predominantly of single phase nitrides and display good thermal shock resistance, strength and corrosion resistance. Little information exists in the utilization of these nitride phases as the bonding agent in conventional refractories. Several limiting factors which have retarded large scale development of nitride bonded refractories include the high cost of purchased silicon nitride, the instability of certain oxynitrides at high temperature, and the hydrolizing tendency of possible starting materials, such as, aluminum nitride and magnesium nitride. To overcome these obstacles, it would be advantageous to form, in situ, nitride phases by the addition of single metallic metal powder which can react with gaseous nitrogen to produce a crystalline nitride phase capable of ceramic bonding to relatively inexpensive refractory grains. This approach will greatly lower the cost of nitride articles and couple the distinct advantages of nitride compounds to the established advantages of conventional refractory grains.

It is an object of the present invention to produce nitride bonded refractories with improved physical properties compared to refractories made with the addition of two or more reactive metal powders.

Another object of the invention is to join a sialon and other nitride phases with conventional refractory grains which are typically bonded by oxides which can be readily decomposed by certain metals to provide properties, such as, non-wetability by molten metals, resistance to chlorine attack and low thermal expansion.

A further object of the invention is to provide nitride bonded refractories having improved porosity and relatively good room temperature and elevated temperature strength.

In accordance with the present invention, there is provided a method for producing nitride bonded refractory shapes in situ. A mixture is prepared comprising about 1 to 25%, by weight, aluminum metallic powder, about 1 to 25%, by weight, substantially pure silica, about 1 to 5% crude clay, and the balance a refractory brick making size graded refractory aggregate. The mixes are pressed into refractory shapes and burned at elevated temperatures in a nitriding atmosphere to form the nitride bond.

In a preferred embodiment, the aluminum comprises about 3 to 13%, the substantially pure silica comprises about 4 to 13%, and the crude clay comprises about 1 to 2%, by weight, of the mix. The shapes are preferably burned at a temperature between about 1090° and 1750° C. and the nitriding atmosphere is composed of either gaseous nitrogen, industrial annealing gas, or ammonia gas. The refractory aggregate is preferably selected from calcined fireclay, fused mullite, synthetic alumina and magnesium alumina spinel.

In a nitrogen atmosphere, at elevated temperatures, aluminum reduces silica forming silicon, alumina, aluminum nitride and gamma aluminum oxynitride. With additional treatment at elevated temperatures, silicon is nitrided to form beta silicon nitride and the alumina, aluminum nitride and aluminum oxynitride enters into the silicon nitride structure as a solid solution to form beta prime sialon. During firing it is always possible that minor levels of oxygen may enter into the chamber confining the refractories. In such an event, the formation of a pure beta prime sialon is hampered and the so-called "X", "J" or aluminum nitride polytypes may also form.

During nitriding, the metallic phase undergoes a gas-metal reaction and forms minute crystals surrounding the metal nucleus. Maintaining a hold during the firing process ensures drainage of the metal from the nucleus through the pores of the crystalline mat which allows additional nitridization of the metal. During the end of the hold period, true ceramic bonding is achieved with the coarse refractory grains by virtue of their solubility in the nitride phases.

To successfully achieve nitridization and also an economical firing schedule, it is preferred that the starting metal powder be as fine as possible. Generally, the aluminum powder should have an average particle diameter of about 34 microns with 90% of the particles being finer than 70 microns. The silica used in the mixes may have one or more ranges of particle size. For instance, extremely fine silica can be used which has an average particle diameter of less than about 1 micron. However, incorporation of large quantities of this exceedingly fine material to a refractory mix, often results in pressing difficulties. It is advantageous to add the very fine silica with a coarser form of silica to obtain the large amount of silica needed in the mix. The crude clay should be balanced between coarse and fine particle size.

It is also preferred that the reactive material not exceed about 20% of the mix for economic reasons. Also, larger quantities do not result in articles with materially improved physical properties.

In the following examples, illustrated below, aluminum powder was mixed with silica, crude clay and either calcined fireclay, fused mullite, synthetic alumina or magnesium aluminate spinel. A solution of dextrin and/or lignin liquor and water was used as a temporary binder. The mixes were formed into shapes by power pressing to about 18,000 psi. The brick were then fired in the presence of flowing nitrogen to a temperature of about 2600° F. with a holding time of about four hours. Mixes were also prepared containing a combination of both aluminum and silicon metal powders. The overall results indicated that the mixes made with only a single metal addition were stronger at elevated temperatures and less porous than mixes made with the two metal additions. The various bonding phases are also shown in Table I.

TABLE I

| MIX | 1 | 2 | 3 | 4 | 5 | 6 | 7 |
|---|---|---|---|---|---|---|---|
| Fused Mullite | 72% | 92% | — | — | — | — | 96.5 |
| Calcined Fireclay | — | — | 72% | 69% | — | — | — |
| Synthetic Alumina | — | — | — | — | 72% | — | — |
| Magnesium Alumininate Spinel | — | — | — | — | — | 72% | — |
| Silica, less than 1 micron | 6 | 4 | 6 | 6 | 6 | 6 | 1.5 |
| Aluminum | 13 | 3 | 13 | 13 | 13 | 13 | 1.0 |
| Crude Clay | 2 | 1 | 2 | — | 2 | 2 | 1.0 |
| Silicon | — | — | — | 5 | — | — | — |
| Silica −200 mesh | 7 | — | 7 | 7 | 7 | 7 | — |
| Apparent Porosity, % | 20.4 | 18.3 | 21.1 | 22.2 | 19.8 | 17.9 | 19.0 |
| Modulus of rupture at room temp. | 4130 | 2360 | 3340 | 2320 | 1970 | 3060 | 1800 |
| Modulus of rupture psi at 1092° C. | 3340 | — | 2790 | 2480 | 2570 | 3890 | — |
| Primary bonding phase | Beta Prime Sialon | Beta Prime Sialon | Beta Prime Sialon | Beta Prime Sialon | Beta Prime Sialon | Magnesium Sialon Polytype | Silicon Oxynitride |

In the above mixes, the refractory aggregate was sized such that about 7 to 20% was retained on a 10 mesh screen, about 23 to 36% was −10+28 mesh, about 15 to 19% was −28+65 mesh, about 7 to 10% was −65+200 mesh and about 30 to 35% passed a 200 mesh screen. All of the above mesh sizes are based upon the Tyler standard series.

As to the raw materials used above, the aluminum powder was pure aluminum metal, and the silica analyzed in excess of 98% $SiO_2$. The refractory aggregate used in the examples have the approximate chemical analysis as shown in Table II below.

TABLE II

|  | Calcined Fireclay | Crude Clay | Fused Mullite | Synthetic Alumina | Magnesium Aluminate Spinel |
|---|---|---|---|---|---|
| $SiO_2$ | 47.3% | 62.9% | 22.9 | 0.1% | 0.2% |
| $Al_2O_3$ | 49.2 | 33.5 | 76.4 | 99.6 | 69.0 |
| $TiO_2$ | 2.4 | 2.1 | 0.1 | 0.01 | 0.04 |
| $Fe_2O_3$ | 1.0 | 1.0 | 0.3 | 0.2 | 0.09 |
| CaO | 0.02 | 0.2 | — | 0.04 | 0.54 |
| MgO | 0.04 | 0.3 | — | 0.04 | 30.1 |
| Alk. | 0.08 | 0.5 | 0.35 | 0.05 | — |

All of the chemical analyses are based on an oxide analysis.

The embodiments of the invention in which an exclusive property or privilege is claimed are defined as follows:

1. A method for producing nitride bonded refratory shapes, in situ, comprising mixing, a composition consisting essentially of, by weight, from about 1 to 25% aluminum, about 1 to 15% substantially pure silica, about 1 to 5% crude clay and the balance a refractory brickmaking size graded refractory aggregate selected from the group consisting of calcined fireclay, fused mullite, synthetic alumina and magnesium aluminate spinel, pressing said mixes into refractory shapes, and burning the shapes at an elevated temperature in a nitriding atmosphere for a time sufficient to form the nitride bond.

2. Method of claim 1 in which the aluminum comprises, by weight, 3 to 13%, the substantially pure silica comprises, by weight, about 4 to 13%, and the crude clay comprises, by weight, about 1 to 2% of the mix.

3. Method of claim 1 in which the shapes are burned at a temperature between about 1090° and 1750° C.

4. Method of claim 1 in which the nitriding atmosphere is selected from the group consisting of gaseous nitrogen, industrial annealing gas and ammonia gas.

* * * * *